Patented Aug. 20, 1940

2,211,943

UNITED STATES PATENT OFFICE 2,211,943

AMINO ANTHRAQUINONE COMPOUNDS

Richard S. Wilder, Hamburg, N. Y., assignor to National Aniline & Chemical Company, Incorporated, New York, N. Y.

No Drawing. Application July 22, 1936,
Serial No. 92,023

18 Claims. (Cl. 260—378)

This invention relates to new amino compounds of the anthraquinone series which are valuable as dyestuffs and as intermediates in the manufacture of dyestuffs.

It is an object of the invention to provide new unsymmetrical 1,4-di(alkylamino)anthraquinone compounds which are valuable dyestuffs for phenol formaldehyde resins and for materials made of or containing organic derivatives of cellulose, producing superior dyeings on the latter materials as compared with those obtained with symmetrical 1,4 - di(alkylamino)anthraquinone compounds.

Other objects of the invention will in part be obvious, and will in part appear hereinafter.

The new dyestuffs of the present invention are unsymmetrical 1,4-di(alkylamino)anthraquinone compounds having in the 1-position of the anthraquinone nucleus a mono-alkylamino radical containing at least two carbon atoms in a hydrocarbon radical (e. g., a mono-alkylamino radical having at least two carbon atoms and containing only an aliphatic hydrocarbon chain, or a mono-alkylamino radical containing an aralkyl hydrocarbon radical), and having in the 4-position an alkylamino radical different from the alkylamino radical in the 1-position. The new dyestuffs may be in the leuco or in the oxidized form. Of particular importance are the anthraquinone compounds of the foregoing type having in the 1-position a mono-alkylamino radical containing at least two carbon atoms in an aliphatic hydrocarbon radical (i. e., an alkylamino radical having the formula —NH.CH$_2$R, wherein R represents an aliphatic hydrocarbon radical).

The preferred products of the present invention are the unsymmetrical 1,4-di(alkylamino)-anthraquinone compounds which contain in the 1-position a mono-alkylamino radical in which the alkyl radical is an aliphatic hydrocarbon chain having at least two carbon atoms and which contain in the 4-position a mono-methyl-amino radical, such as, for example, 1-ethylamino-4-methylaminoanthraquinone and 1-amylamino-4-methylaminoanthraquinone. Compounds of this type have been found to possess particularly valuable properties in the dyeing of materials made of or containing organic derivatives of cellulose.

The unsymmetrical 1,4-di(alkylamino)anthraquinone compounds of the present invention are crystalline materials which are soluble in organic solvents to form solutions which are blue in color and tend to become greener as the number of carbon atoms in the substituent alkyl groups increases. In the form of dispersions, they dye phenol-formaldehyde resins and materials made of organic derivatives of cellulose deep blue to green-blue shades. The shades are not sensitive to alkali or acid, and are faster to light and greener and brighter in shade than those obtained with symmetrical 1,4-di(alkylamino)anthraquinone compounds. For example, the color produced on acetate silk by dyeing this material with 1-ethylamino-4-methylaminoanthraquinone is greener and brighter in shade and is faster to light than the color produced on acetate silk by dyeing with symmetrical 1,4-dimethylaminoanthraquinone. While unsymmetrical 1,4-di(alkylamino)anthraquinone compounds in which one of the alkyl groups is an aralkyl hydrocarbon radical (as, for example, 1-benzylamino-4-methylaminoanthraquinone) are of value for dyeing materials made of organic derivatives of cellulose, they have less affinity for such materials than the unsymmetrical 1,4-di(alkylamino)anthraquinone compounds in which both of the alkyl groups are aliphatic hydrocarbon radicals, and are not as easily dispersed in dyeing compositions prepared for directly dyeing organic derivatives of cellulose.

The new unsymmetrical 1,4-di(alkylamino)-anthraquinone compounds may be conveniently prepared by condensing a 1-alkylamino-4-hydroxyanthraquinone compound in the leuco form, the alkylamino radical in the 1-position having the characteristics pointed out above, with an alkylamine different from that corresponding with the alkylamino radical in the 1-position in the anthraquinone nucleus. This condensation is effective in replacing the hydroxyl group in the 4-position of the anthraquinone nucleus with the residue of the amine employed.

A preferred method of obtaining the new unsymmetrical 1,4 - di(alkylamino)anthraquinone compounds of the present invention, however, employs as starting materials 1,4-dihydroxyanthraquinone compounds (i. e., anthraquinone compounds containing hydroxyl groups in the 1- and 4-positions, and which may contain other substituents which do not adversely affect amination reaction in other positions of the anthraquinone nucleus). In accordance with this procedure, a 1,4-dihydroxyanthraquinone compound in leuco form (e. g., leuco quinizarine) is condensed with about one molecular proportion of a primary alkylamine containing at least two carbon atoms in a hydrocarbon radical, and particularly a primary alkylamine containing at least two carbon atoms in an aliphatic hydrocarbon radical and which is free of aryl groups (i. e., an amine which is a member of the class represented by the formula NH₂CH₂R, wherein R is an aliphatic hydrocarbon radical). This condensation is effective in substantially replacing one hydroxyl group of the anthraquinone nucleus without having any practical effect with respect to the replacement of the other hydroxyl group, and thereby results in the formation of a leuco 1-alkylamino-4-hydroxyanthraquinone compound to the practical exclusion of the 1,4-di(alkylamino) product.

For the preparation of an unsymmetrical 1,4-di(alkyl-amino) anthraquinone compound, the leuco 1-alkylamino-4-hydroxy-anthraquinone compound formed in the foregoing manner may be condensed with a second alkylamine which is different from the amine employed for the replacement of the first hydroxyl group, without separating the leuco 1-alkylamino-4-hydroxyanthraquinone compound from the reaction mass in which it is formed. The condensation may be effected under atmospheric or superatmospheric pressures. The leuco 1,4-di(alkylamino) anthraquinone compound is preferably oxidized to the corresponding quinoid form and recovered as such since the leuco compound possesses considerable solubility in the reaction mass in which it is formed. The oxidation may be carried out in any desirable manner, as, for example, with air or with an organic nitro compound and the oxidized product then separated from the reaction mass as by filtration.

The invention will be further illustrated by the following examples, in which the parts are by weight and the temperatures in degrees centigrade, describing the preparation of preferred products. It will be understood, however, the invention is not limited thereto.

*Example I.*—A mixture of 50 parts of leuco quinizarine (obtained, for example, by reducing quinizarine in neutral or slightly alkaline, aqueous suspension with sodium hydrosulfite at 60 to 80°), 325 parts of methyl alcohol and 50 parts of a 33 per cent aqueous solution of monoethylamine is agitated and boiled vigorously for one hour in a flask with a suitable reflux condenser. The resulting condensation product which is formed in the mixture is mainly the leuco derivative of 1-mono-ethylamino-4-hydroxyanthraquinone.

30 parts of a 38 per cent aqueous solution of mono-methylamine are then added to the mixture, and the resulting mixture is boiled for about one and a half hours. The condensing reaction results in the formation of leuco 1-mono-ethylamino-4-mono-methylaminoanthraquinone. To convert the leuco compound into its corresponding quinoid form, 20 parts of nitrobenzene are added to the mixture which is then boiled for a further two hours and then cooled to about 30°, whereby 1-mono-ethylamino-4-mono-methylaminoanthraquinone is precipitated. The mixture is filtered and the crystalline residue on the filter is washed with about 120 parts of methyl alcohol and then is dried in air or vacuo.

The dry product which is mainly 1-mono-ethylamino - 4 - mono - methylaminoanthraquinone is a dark blue crystalline solid which is insoluble in water and in aqueous alkaline solutions. It is sparingly soluble in cold alcohol and readily soluble in organic solvents, such as chlorbenzene, nitrobenzene, toluene, xylene, etc., to form deep blue solutions which do not change color upon the addition thereto of alkalis. The compound dissolves readily in concentrated sulfuric acid to form a brown solution which, upon gradual dilution with water, changes to a red solution and finally deposits the 1-mono-ethylamino-4 - mono - methylaminoanthraquinone in the form of fine blue crystals. The compound dyes cellulose acetate a strong, clear shade of blue of excellent fastness to light.

By analogous methods, other unsymmetrical 1,4-di-(alkylamino)anthraquinone compounds which contain in the 1-position a mono-alkylamino radical containing at least two carbon atoms in an aliphatic hydrocarbon chain and in the 4-position an alkylamino radical different from the alkylamino radical in the 1-position of the anthraquinone nucleus may be formed. Thus, by employing amylamine for the first amination, and methylamine for the second amination, 1-mono-amylamino-4-mono-methylaminoanthraquinone may be produced in similar manner. This compound is a bronzy, soft crystalline substance which dissolves readily in organic solvents, such as, chlorbenzene, nitrobenzene, toluene, xylene, etc., to form blue solutions which are slightly greener in shade than corresponding solutions of 1-mono-ethylamino-4-mono-methylaminoanthraquinone. It dissolves in alcohol to form blue solutions which do not change in shade on addition thereto of alkali. It dissolves readily in concentrated sulfuric acid to form a solution which upon gradual dilution with water becomes red and finally deposits 1 - mono - amylamino - 4-mono-methylaminoanthraquinone in the form of blue crystals. The compound can be purified by crystallizing it from its toluene solution which deposits the 1-mono-amylamino-4 - mono - methyl-aminoanthraquinone as fine, blue, relatively soft, needle-like crystals. The compound dyes materials made of cellulose esters and ethers and phenol-formaldehyde resins greenish-blue shades of very good fastness to light. The shades obtained on cellulose ester products with 1-mono-amyl-amino-4-mono-methylaminoanthraquinone are somewhat greener than those obtained with the 1-mono-ethyl-amino-4-mono - methylaminoanthraquinone.

*Example II.*—A mixture of 50 parts of leuco quinizarine, 25 parts of benzylamine and 325 parts of methyl alcohol is vigorously agitated and boiled for about 15 minutes. The mixture becomes a magma of crystals of the leuco compound of 1-mono-benzylamino-4-hydroxyanthraquinone.

To produce a 1,4-diaminated product, the magma of crystals is thinned by addition thereto of 50 parts of a 40 per cent aqueous solution of mono-methylamine and is boiled under reflux for about one-half hour. To convert the thus formed leuco 1-mono-benzylamino-4-mono-methylaminoanthraquinone into its quinoid form, 20 parts of nitrobenzene are added to the mixture which is then boiled for about one-half hour and cooled to about 30°. The resulting slurry of crystals is filtered, the filter cake is washed on the filter with about 160 parts of methyl alcohol and dried in air or vacuo.

The dry compound which is mainly 1-mono-benzylamino-1-mono-methylaminoanthraquinone is a dark blue crystalline powdery substance which dissolves in organic solvents, such as chlorbenzene, nitrobenzene, toluene, xylene, etc., to form dark blue solutions. It dissolves in concentrated sulfuric acid to form a brown solution, which upon gradual dilution with water, turns red and finally deposits the 1-mono-benzylamino-4-mono-methylaminoanthraquinone in the form of hard, blue crystals.

It dyes cellulose acetate a bright, clear blue of excellent fastness to light.

The procedures illustrated in the examples may be varied so as to be productive of a wide variety of unsymmetrical 1,4-di(alkylamino)anthraquinone compounds included within the scope of the present invention. Thus, products having similar properties may be prepared in an analogous manner by employing other leuco 1,4-dihydroxyanthraquinone compounds, such as, for example, leuco 1,4,5,8-tetrahydroxyanthraquinone, leuco 1,4,5-trihydroxyanthraquinone, leuco 1,4,7,8-tetrahydroxyanthraquinone, leuco 1,4-dihydroxyanthraquinone-6-carboxylic acid ethyl ester, leuco 5-(or 6)-chloro-1,4-dihydroxyanthraquinone, etc., in place of the leuco quinizarine of the above examples.

Furthermore, in place of the primary alkylamines employed for condensation with the leuco 1,4-dihydroxyanthraquinone compounds to prepare the leuco 1-alkylamino-4-hydroxyanthraquinone compounds in the above examples, other primary alkyl-mono-amines which contain only aliphatic hydrocarbon radicals, such as, for example, mono-propylamine, mono-butylamine, mono-hexylamine, laurylamine, cetylamine, etc., and aralkylamines, such as, for example, phenyl ethylamine, phenyl propylamine, diphenyl methylamine, etc., may be used. For reaction with the leuco 1-alkylamino-4-hydroxyanthraquinone compounds, to form the 1,4-di(alkylamino)anthraquinone bodies, in addition to other primary alkylamines containing only a hydrocarbon radical, primary alkylamines which contain substituents, such as, for example, hydroxyl, halogen, or alkoxy groups or alkylene diamines may be employed in place of the methylamine of the above examples. As examples of such amines may be mentioned hydroxyethylamine, ethylene diamine, etc. It will be understood, therefore, that the anthraquinone compounds of the present invention are such as may contain substituted or unsubstituted alkylamino groups in the 4-position of the anthraquinone nucleus.

It will be understood, of course, that while the foregoing examples are illustrative of preferred methods for the preparation of the unsymmetrical 1,4-di(alkylamino)anthraquinone compounds of the present invention, these compounds may be prepared by other methods.

Since certain modifications may be made in the products illustrated in the foregoing description, it is intended that all matter contained therein should be interpreted as illustrative and not in a limiting sense.

I claim:

1. An unsymmetrical 1,4-di(alkylamino)anthraquinone compound having in the 1-position of the anthraquinone nucleus a mono-alkylamino radical containing at least two carbon atoms in a hydrocarbon radical and having in the 4-position an alkylamino radical different from the first-mentioned alkylamino radical.

2. A leuco 1,4-di(alkylamino)anthraquinone compound having in the 1-position of the anthraquinone nucleus a mono-alkylamino radical containing at least two carbon atoms in a hydrocarbon radical, and having in the 4-position an alkylamino radical different from the first-mentioned alkylamino radical.

3. An unsymmetrical 1,4-di(alkylamino)anthraquinone compound having in the 1-position of the anthraquinone nucleus a mono-alkylamino radical containing at least two carbon atoms in an aliphatic hydrocarbon chain and having in the 4-position an alkylamino radical different from the first-mentioned alkylamino radical.

4. An unsymmetrical 1,4-di(alkylamino)anthraquinone compound having in the 1-position of the anthraquinone nucleus a mono-alkylamino radical containing at least two carbon atoms in a hydrocarbon radical and having in the 4-position a mono-alkylamino radical containing a hydrocarbon radical, said last mentioned mono-alkylamino radical being different from the mono-alkylamino radical in the 1-position of the anthraquinone nucleus.

5. An unsymmetrical 1,4-di(alkylamino)anthraquinone compound having in the 1-position of the anthraquinone nucleus a mono-alkylamino radical containing at least two carbon atoms in an aliphatic hydrocarbon chain and having in the 4-position a mono-alkylamino radical containing an aliphatic hydrocarbon chain, said last mentioned mono-alkylamino radical being different from the mono-alkylamino radical in the 1-position of the anthraquinone nucleus.

6. An unsymmetrical 1,4-di(alkylamino)anthraquinone compound having in the 1-position of the anthraquinone nucleus a mono-alkylamino radical containing at least two carbon atoms in a hydrocarbon radical and having in the 4-position a methylamino radical.

7. An unsymmetrical 1,4-di(alkylamino)anthraquinone compound having in the 1-position of the anthraquinone nucleus a mono-alkylamino radical containing at least two carbon atoms in an aliphatic hydrocarbon chain and having in the 4-position a methylamino radical.

8. A leuco 1.4-di(alkylamino)anthraquinone compound having in the 1-position of the anthraquinone nucleus a mono-alkylamino radical containing at least two carbon atoms in an aliphatic hydrocarbon chain and having in the 4-position a methylamino radical.

9. An unsymmetrical 1,4-di(alkylamino)anthraquinone compound having in the 1-position of the anthraquinone nucleus an ethylamino radical and in the 4-position a methylamino radical.

10. An unsymmetrical 1,4-di(alkylamino)anthraquinone compound having in the 1-position of the anthraquinone nucleus an amylamino radical and in the 4-position a methylamino radical.

11. An unsymmetrical 1,4-di(alkylamino)anthraquinone compound having in the 1-position of the anthraquinone nucleus a benzylamino radical and in the 4-position a methylamino radical.

12. 1-ethylamino-4-methylaminoanthraquinone.

13. 1-amylamino-4-methylaminoanthraquinone.

14. An unsymmetrical 1,4-di(alkylamino)anthraquinone having in the 1-position of the anthraquinone nucleus an alkylamino radical selected from the group consisting of ethylamino, amylamino, and benzylamino radicals and in the 4-position a methylamino radical.

15. A leuco 1,4-di(alkylamino)anthraquinone having in the 1-position of the anthraquinone nucleus an alkylamino radical selected from the group consisting of ethylamino, amylamino, and benzylamino radicals and in the 4-position a methylamino radical.

16. 1,4-diaminoanthraquinones corresponding to the general formula:

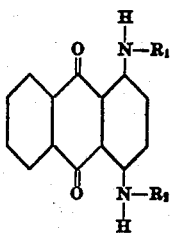

wherein $R_1$ and $R_2$ are alkyl radicles different from each other.

17. An unsymmetrical 1,4-di(alkylamino)anthraquinone compound having in the 1-position of the anthraquinone nucleus a mono-alkylamino radical containing at least two carbon atoms in an open-chain hydrocarbon radical and having in the 4-position a mono-alkylamino radical in which the alkyl radical is an open-chain radical different from said open-chain hydrocarbon radical.

18. An unsymmetrical 1,4-di(alkylamino)anthraquinone compound having in the 1-position of the anthraquinone nucleus an aralkylamino radical, and having in the 4-position a mono-alkylamino radical in which the alkyl radical is an open-chain radical.

RICHARD S. WILDER.